(12) United States Patent
Kini (10) Patent No.: US 8,400,923 B2
(45) Date of Patent: Mar. 19, 2013

(54) MULTIPATH TRANSMISSION CONTROL PROTOCOL PROXY

(75) Inventor: Sriganesh Kini, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 214 days.

(21) Appl. No.: 12/905,990

(22) Filed: Oct. 15, 2010

(65) Prior Publication Data

US 2012/0093150 A1  Apr. 19, 2012

(51) Int. Cl.
*H04L 12/26* (2006.01)
*H04L 12/56* (2006.01)
*H04L 12/66* (2006.01)
*H04W 4/00* (2009.01)
*G06F 15/16* (2006.01)
*G06F 15/173* (2006.01)

(52) U.S. Cl. .......... 370/235; 370/338; 370/395.52; 370/401; 370/466; 370/535; 709/203; 709/230; 709/238

(58) Field of Classification Search .......... 370/235, 370/338, 395.52, 401, 466, 535; 709/203, 709/230, 238
See application file for complete search history.

(56) References Cited

U.S. PATENT DOCUMENTS

| | | | |
|---|---|---|---|
| 7,184,418 B1 * | 2/2007 | Baba et al. ........ | 370/331 |
| 2004/0122976 A1 * | 6/2004 | Dutta et al. ........ | 709/245 |
| 2005/0071510 A1 * | 3/2005 | Belimpasakis ........ | 709/250 |
| 2007/0008884 A1 * | 1/2007 | Tang ........ | 370/230 |
| 2007/0014241 A1 * | 1/2007 | Banerjee et al. ........ | 370/238 |
| 2007/0071004 A1 * | 3/2007 | Hasegawa et al. ........ | 370/390 |
| 2007/0091862 A1 * | 4/2007 | Ioannidis ........ | 370/338 |
| 2007/0280230 A1 * | 12/2007 | Park ........ | 370/390 |
| 2008/0062879 A1 | 3/2008 | Sivakumar et al. | |
| 2011/0235578 A1 * | 9/2011 | Laganier et al. ........ | 370/328 |
| 2011/0296006 A1 * | 12/2011 | Krishnaswamy et al. ..... | 709/224 |
| 2012/0020284 A1 * | 1/2012 | Haddad ........ | 370/328 |
| 2012/0144062 A1 * | 6/2012 | Livet et al. ........ | 709/239 |

* cited by examiner

*Primary Examiner* — Alpus H Hsu
(74) *Attorney, Agent, or Firm* — Blakely Sokoloff Taylor & Zafman, LLP (57) ABSTRACT

An edge router runs a Multipath Transmission Control Protocol (MPTCP) proxy to allow for a host that implements TCP (Transmission Control Protocol) to operate normally yet reap the benefits of an MPTCP connection. An upgrade of a TCPIP stack on the host is not necessary. The edge router demultiplexes packets received from the host over a TCP connection to an MPTCP connection and multiplexes packets sent to the host over an MPTCP connection to a TCP connection. As a result, higher throughput of packet communication can be realized, for example, for improved video support.

15 Claims, 6 Drawing Sheets

MULTIPATH TRANSMISSION CONTROL PROTOCOL PROXY

FIELD OF THE INVENTION

Embodiments of the invention relate to the field of Transmission Control Protocol (TCP) service; and more specifically, to improving throughput of data communicated to and from a host or client running TCP.

BACKGROUND

A host is, for example, a server, laptop, or mobile phone that communicates with another host or subscriber end station, such as another server, laptop, or mobile phone. A host that runs TCP utilizes a TCP connection to send and receive packets with another host or subscriber end station. An edge router assists the host by transmitting packets over the TCP connection to and from the host. The edge router does not terminate or initiate the TCP connection, but rather acts to ensure that packets are transmitted correctly.

Multipath Transmission Control Protocol (MPTCP) is a potential implementation that would have various benefits over TCP. MPTCP utilizes multiple paths for one TCP connection and therefore allows for higher throughput in data communications. Higher traffic applications, such as video, could be more easily supported using MPTCP. However, MPTCP is not widely implemented and even if it were implemented in this case, hosts that run TCP would not be capable of taking advantage of MPTCP if the TCPIP stack on the host is not upgraded. Upgrading the TCPIP stack on every single IP enabled host would be a challenging and time-consuming process, e.g., on the order of years or decades to update billions of such devices. Moreover, coordinating the upgrades can add to the complications of this process.

SUMMARY

This invention takes advantage of an MPTCP connection without requiring that the TCPIP stack on a host be upgraded. This is done by running an MPTCP proxy on the edge router that is coupled to the host. As a result, the host is unaware of any MPTCP utilization and runs TCP as normal. The edge router performs the necessary conversions between TCP and MPTCP so that packets sent from the host over a TCP connection are demultiplexed to a MPTCP connection, and likewise, packets sent to the host over an MPTCP connection are multiplexed by the edge router to a TCP connection.

A method in an edge router to facilitate communications between a subscriber end station running TCP and a second electronic device that is one of a second edge router and server end station comprises the following steps. The edge router registers an Internet Protocol (IP) address of the subscriber end station with a domain name server to indicate that the subscriber end station is MPTCP capable, wherein the edge router runs an MPTCP proxy to facilitate the subscriber end station having only the appearance to the second electronic device of being MPTCP capable but in actuality is TCP capable and not MPTCP capable. The second electronic device is running at least one of MPTCP and MPTCP proxy. The edge router receives packets from the subscriber end station destined for the second electronic device or from the second electronic device destined for the subscriber end station. The edge router determines that the packets are either received from the subscriber end station over a TCP connection or from the second electronic device over an MPTCP connection. In response to determining that the packets are received from the subscriber end station over the TCP connection, the edge router performs the following steps. The edge router demultiplexes the packets to convert the packets for transmission over the MPTCP connection, whereby utilizing MPTCP for the packets rather than maintaining TCP increases throughput by taking advantage of higher bandwidth capabilities of MPTCP compared to TCP and transmits the packets over the MPTCP connection to the second edge router or server end station. In response to determining that the packets are received from the second electronic device over the MPTCP connection, the edge router performs the following steps. The edge router multiplexes the packets to convert the packets for transmission over the TCP connection, whereby the edge router converting from MPTCP to TCP allows the subscriber end station to receive packets from the MPTCP connection without reconfiguring its own TCP setup and transmits the packets over the TCP connection to the subscriber end station.

An edge router configured to utilize a MPTCP connection for a subscriber end station running TCP comprises the following modules. A registration module is configured to register an Internet Protocol (IP) address of the subscriber end station with a domain name server to indicate that the subscriber end station is MPTCP capable, wherein the edge router runs MPTCP proxy to facilitate the subscriber end station having only the appearance to a second electronic device running at least one of MPTCP and MPTCP proxy of being MPTCP capable but in actuality is TCP capable and not MPTCP capable. An input module is configured to receive packets from the subscriber end station over a TCP connection. A packet conversion module is configured to demultiplex the packets to utilize MPTCP, whereby utilizing MPTCP for the packets rather than maintaining TCP increases throughput by taking advantage of higher bandwidth capabilities of MPTCP compared to TCP. An output module is configured to transmit the packets out of the edge router over an MPTCP connection to the second electronic device, wherein the second electronic device runs one of MPTCP and MPTCP proxy and is one of a second edge router and a server end station.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, palm tops, mobile phones, smartphones, multimedia phones, Voice Over Internet Protocol (VOIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some network elements include functionality for AAA (authentication, authorization, and accounting) protocols (e.g., RADIUS (Remote Authentication Dial-In User Service), Diameter, and/or TACAS+ (Terminal Access Controller Access Control System). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information, etc.) used during processing of that subscriber's traffic.

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), 802.1Q Virtual LAN (VLAN), Internet Protocol, ATM, etc. A subscriber session can be initiated using a variety of mechanisms: manual provisioning a dynamic host configuration protocol (DHCP), DHCP/client-less internet protocol service (CLIPS), Media Access Control (MAC) address tracking, etc. For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

Certain network elements (e.g., certain edge network elements) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end stations to the network element. These parent circuits may represent physical or logical aggregations of subscriber circuits (e.g., a virtual local area network (VLAN), a private virtual circuit (PVC) (e.g., for Asynchronous Transfer Mode (ATM)), a circuit-group, a channel, a pseudo-wire, a physical port of the network element, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical ports for purposes of bandwidth aggregation and redundancy. Thus, the parent circuits physically or logically encapsulate the subscriber circuits.

Some network elements support the configuration of multiple contexts. As used herein, each context includes one or more instances of a virtual network element (e.g., a virtual router, a virtual bridge (which may act as a virtual switch instance in a Virtual Private LAN Service (VPLS)). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple contexts may be employed in an edge network element to provide direct network access and/or different classes of services for subscribers of service and/or content providers.

Within certain network elements, multiple "interfaces" may be configured. As used herein, each interface is a logical entity, typically configured as part of a context, which provides higher-layer protocol and service information (e.g., Layer 3 addressing) and is independent of physical ports and circuits (e.g., ATM PVC (permanent virtual circuits), 802.1Q VLAN circuits, QinQ circuits, DLCI circuits, etc.). The subscriber records in the AAA server identify, in addition to the other subscriber configuration requirements, to which context (e.g., which of the virtual routers) the corresponding subscribers should be bound within the network element. As used herein, a binding forms an association between a physical entity (e.g., port, channel, etc.) or a logical entity (e.g., circuit (e.g., subscriber circuit, logical circuit (a set of one or more subscriber circuits), etc.), etc.) and a context's interface over which network protocols (e.g., routing protocols, bridging protocols) are configured for that context. Subscriber data flows on the physical entity when some higher-layer protocol interface is configured and associated with that physical entity.

Some network elements provide support for implementing VPNs (Virtual Private Networks) (e.g., Layer 2 VPNs and/or Layer 3 VPNs). For example, the network element at where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network elements). Layer 2 circuits are configured between the CEs and PEs (e.g., an Ethernet port, an 802.1Q permanent virtual circuit (PVC), an on-demand 802.1Q PVC, a Frame Relay PVC, an Asynchronous Transfer Mode (ATM) PVC, etc.). In a Layer 3 VPN, routing typically is performed by the PEs. By way of example, an edge network element that supports multiple contexts may be deployed as a PE; and a context may be configured with a VPN protocol, and thus that context is referred as a VPN context.

Some network elements provide support for VPLS (Virtual Private LAN Service). For example, in a VPLS network, subscriber end stations access content/services provided through the VPLS network by coupling to CEs, which are coupled through PEs coupled by other network elements. VPLS networks can be used for implementing triple play network applications (e.g., data applications (e.g., high-speed Internet access), video applications (e.g., television service such as IPTV (Internet Protocol Television), VoD (Video-on-Demand) service, etc.), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs, etc.) based on the MAC destination address field included in those frames.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

Figure 1:
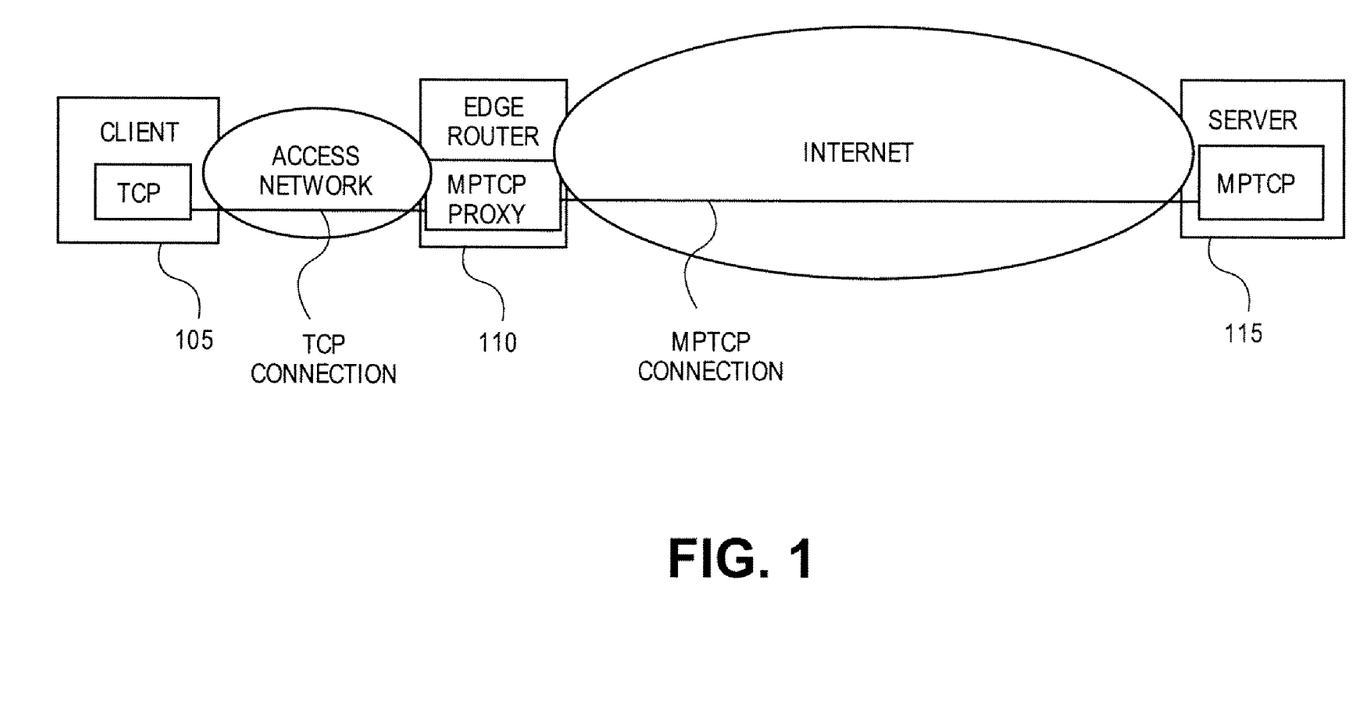
FIG. 1 illustrates an exemplary computer system of a client and server according to one embodiment of the invention.

FIG. 1 illustrates an exemplary computer system of a client and server according to one embodiment of the invention. Client 105 and server 115 communicate with each other via edge router 110. Edge router 110 is implemented such that improved throughput is achieved by taking advantage of an MPTCP connection over the Internet.

Client 105 runs TCP while server 115 runs MPTCP. Since the TCPIP stack in client 105 is not configured for MPTCP, packets sent from client 105 would normally not be able to take advantage of the benefits of an MPTCP connection over the Internet. Rather, the packets from client 105 would simply be transmitted over the access network to edge router 110 and then over a single path of the MPTCP connection; the remaining paths would be left unused. However, edge router 110 runs an MPTCP proxy so as to facilitate communications between client 105 and server 115. Now, although client 105 is unaware of the conversion occurring in edge router 110, client 105 is able to take advantage of higher throughput enabled by an MPTCP connection, even though client 105 has not been upgraded from TCP to MPTCP.

Edge router 110 manages data packets both transmitted to and from client 105. In one embodiment, client 105 transmits packets over the access network to edge router 110 using a TCP connection. Because edge router 110 runs an MPTCP proxy, it can process the packets from a TCP connection to multiple paths over an MPTCP connection. Edge router 110 terminates the TCP connection with client 105 and initiates an MPTCP connection with server 115. Edge router 110 demultiplexes the packets received from client 105 for transmission over an MPTCP connection. Edge router 110 sends the packets over the MPTCP connection, i.e., a new connection, over the Internet and to server 115. Server 115 is running MPTCP and therefore receives the packets without issue.

In one embodiment, server 115 transmits packets to client 105. Server 115 runs MPTCP and therefore sends packets over an MPTCP connection over the Internet to edge router 110. Edge router 110 runs an MPTCP proxy and therefore is compatible with the MPTCP connection to server 115. Edge router 110 terminates the MPTCP connection and initiates a TCP connection with client 105 (which runs TCP and not MPTCP). Edge router 110 multiplexes the packets received over the MPTCP connection for transmission over the TCP connection over the access network and to client 105. Thus, client 105 is able to receive communications transmitted over an MPTCP connection even though client 105 itself runs TCP, and not MPTCP.

A TCP connection is uniquely identified by a source IP address, a destination IP address, an IP-header protocol type (TCP), a source-port and a destination-port. MPTCP connections are also uniquely identified in this manner. A segment within a TCP connection is uniquely identified with its sequence number. The multiplexing and demultiplexing procedures at the edge router 110 consist of maintaining a mapping from a segment on the TCP connection into a segment on an MPTCP constituent connection. To maintain this mapping the unique identification for the TCP segment (as described above) is used. When a segment is received at the edge router 110 on the TCP connection it is mapped to a segment on an MPTCP connection. When the acknowledgement message arrives for that segment on the MPTCP connection the acknowledgement message for the corresponding segment on the TCP connection is sent. Similarly, when a segment is received on a MPTCP constituent, it is mapped to a segment on the TCP connection. When an acknowledgement message is received for that segment on the TCP connection, the acknowledgement for the corresponding segment on the MPTCP connection is sent.

Figure 2:
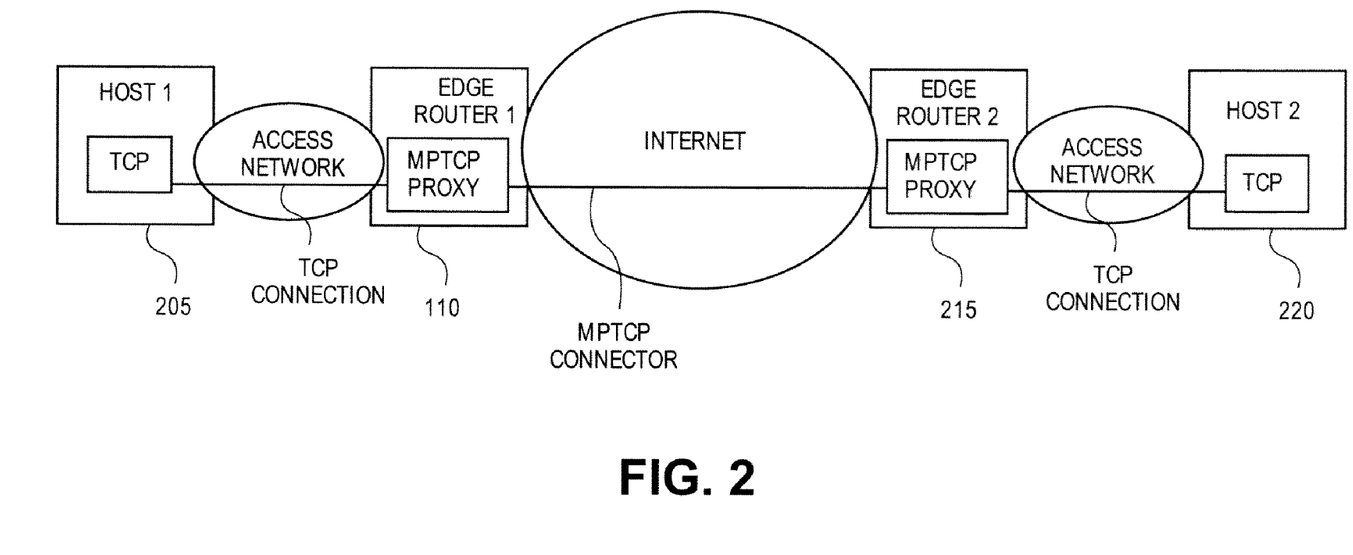
FIG. 2 illustrates an exemplary computer system of two hosts according to one embodiment of the invention.

FIG. 2 illustrates an exemplary computer system of two hosts according to one embodiment of the invention. In this embodiment, host 1 205 communicates with host 2 220. These hosts run TCP, but can take advantage of an MPTCP connection over the Internet, resulting in higher throughput for data. Edge routers 1 and 2 110, 215 that run MPTCP proxies support this capability.

Packets are transmitted between host 1 205 and edge router 1 110 over a TCP connection in an access network. Packets are also transmitted between host 2 220 and edge router 2 215 over a TCP connection in an access network. Edge routers 1 and 2 110, 215 run MPTCP proxies so that packets can be transmitted over an MPTCP connection over the Internet.

When host 1 205 initiates a TCP connection with edge router 1 110 and transmits packets to edge router 1 110, edge router 1 110 terminates that TCP connection and demultiplexes the packets for MPTCP. Edge router 1 110 sends the converted packets over an MPTCP connection over the Internet to edge router 2 215, which also runs an MPTCP proxy and is therefore compatible with MPTCP. Edge router 2 215 terminates the MPTCP connection and initiates a new TCP connection over access network with host 2 220. Edge router 2 215 multiplexes the packets from the MPTCP connection for transmission over the TCP connection and sends the packets to host 2 220. Host 2 220 runs TCP and is unaware of the conversions occurring at edge routers 1 and 2 110, 215. Likewise, the reverse occurs when host 2 220 initiates a TCP connection to send packets to host 1 205.

Figure 3:
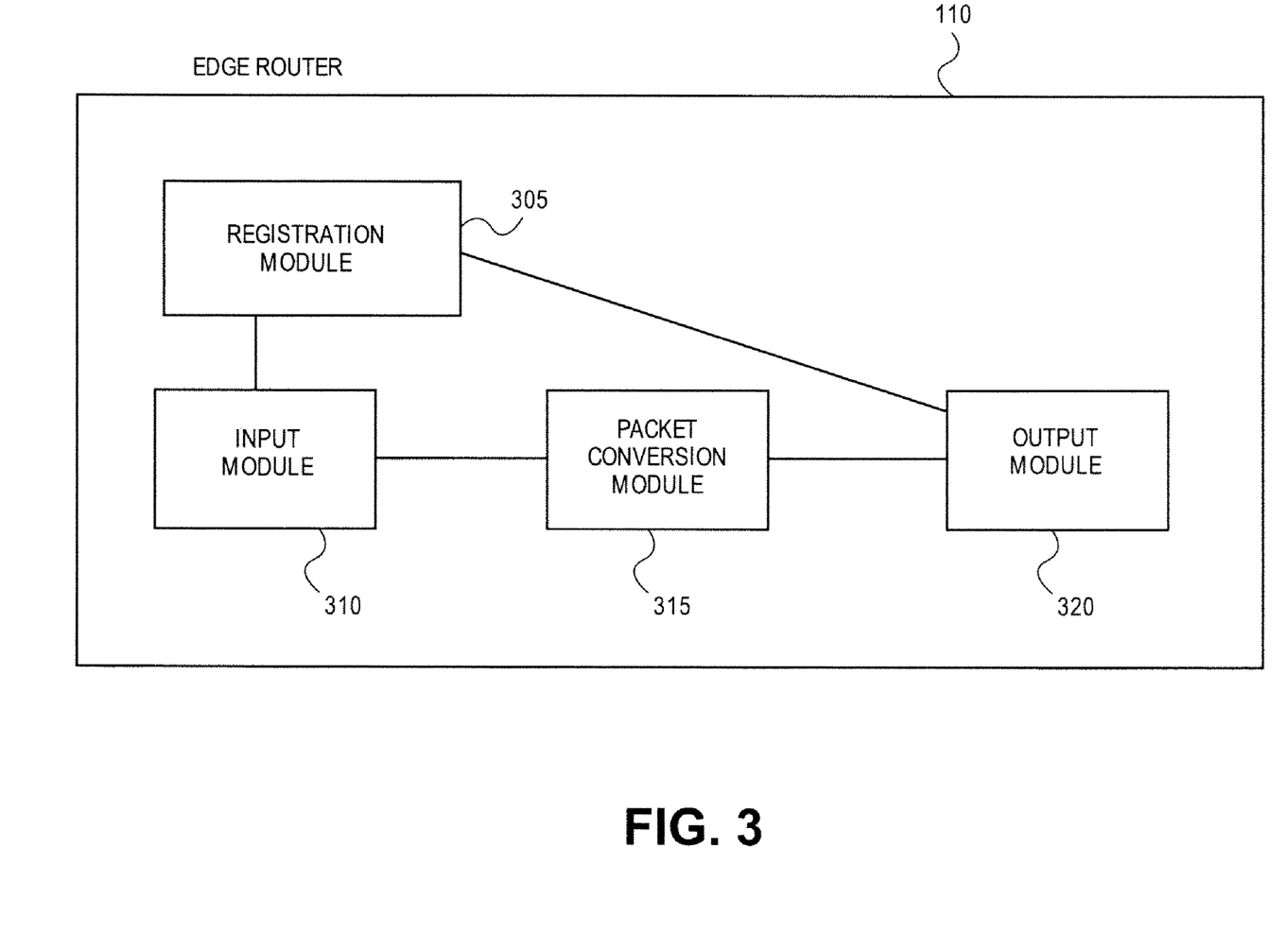
FIG. 3 is an exemplary edge router according to one embodiment of the invention.

FIG. 3 is an exemplary edge router according to one embodiment of the invention. Edge router 110 includes various modules to receive, process, and transmit data packets, including a registration module 305, an input module 310, a packet conversion module 315, and an output module 320. Edge router 110 allows for packets to be transmitted over both TCP and MPTCP connections while taking advantage of multiple paths of MPTCP.

Edge router 110 is coupled to a subscriber end station that has not been updated to MPTCP, e.g., a client, a host, etc. and enables communications with the subscriber end station to fully utilize MPTCP. Registration module 305 registers an IP address of the subscriber end station with a domain name server. This registration gives the subscriber end station the appearance to other edge routers, servers, etc. of being MPTCP capable even though in actuality the subscriber end station is only TCP capable and not MPTCP capable. Therefore, the other edge routers, servers, etc. that run either MPTCP or MPTCP proxy will utilize an MPTCP connection when transmitting data packets to edge router 110.

Input module 310 receives packets from the subscriber end station over a TCP connection. At this time, the TCP connection is terminated at edge router 110 for packet conversion. Packet conversion module 315 converts the packets received by input module 310 and demultiplexes the packets to utilize the higher bandwidth path capabilities of MPTCP compared to TCP. Output module 320 then transmits the converted packets out of edge router 110 over an MPTCP connection to another electronic device, such as another edge router or server end station that runs either MPTCP or MPTCP proxy.

In regard to the packet conversion, when a segment is received on the TCP connection, a copy of the TCP header is stored locally and that segment is sent on one of the MPTCP-constituent connections. The association between the TCP header of the incoming segment and the MPTCP header of the outgoing segment is maintained at the edge router. When an acknowledgement is received on a MPTCP constituent at the edge router, the acknowledgement for the corresponding segment on the TCP connection is sent.

Edge router 110 also facilitates communications in the reverse direction, i.e., from the MPTCP-capable electronic device to the TCP-capable subscriber end station. In this embodiment, input module 310 receives packets from the edge router or server end station over an MPTCP connection. That edge router or server end station believes that the TCP-capable subscriber end station supports MPTCP because registration module 305 had indicated as such during registration. At this point, the MPTCP connection is terminated at edge router 110. Packet conversion module 315 multiplexes the packets to accommodate TCP and output module 320 then transmits the packets out of edge router 110 over a newly initiated TCP connection and on to the subscriber end station.

Further, in one embodiment, packet conversion module 315 stores header information from packets received by input module 310. This header information is used to handle transmission of acknowledgements as confirmation that data packets have been received. For the direction of packets transmitted from a TCP-capable subscriber end station to an MPTCP-capable edge router or server end station, an acknowledgement is received by edge router 110 from the MPTCP-capable edge router or server end station to confirm that the packets have successfully been transmitted. This acknowledgement is received over an MPTCP connection. Edge router 110 will route the acknowledgement over a TCP connection and therefore looks to the header information previously stored by packet conversion module 315 to assist in the routing.

Acknowledgements are also received by edge router 110 in the reverse direction. In this case, packets are transmitted from an MPTCP-capable edge router or server end station to a TCP-capable subscriber end station and the header information is captured by packet conversion module 315. Therefore, an acknowledgement is transmitted from the TCP-capable subscriber end station to edge router 110 over a TCP connection to confirm that the packets have successfully been received. Edge router 110 cannot simply pass on the acknowledgement to the MPTCP-capable edge router or server end station because multiple paths exist and further processing is needed to convert the acknowledgement for transmission. Here, packet conversion module 315 looks at the header information that was previously stored to parse the acknowledgement and transmit it over the appropriate paths of the MPTCP connection and onto the MPTCP-capable edge router or server end station.

Figure 4A:
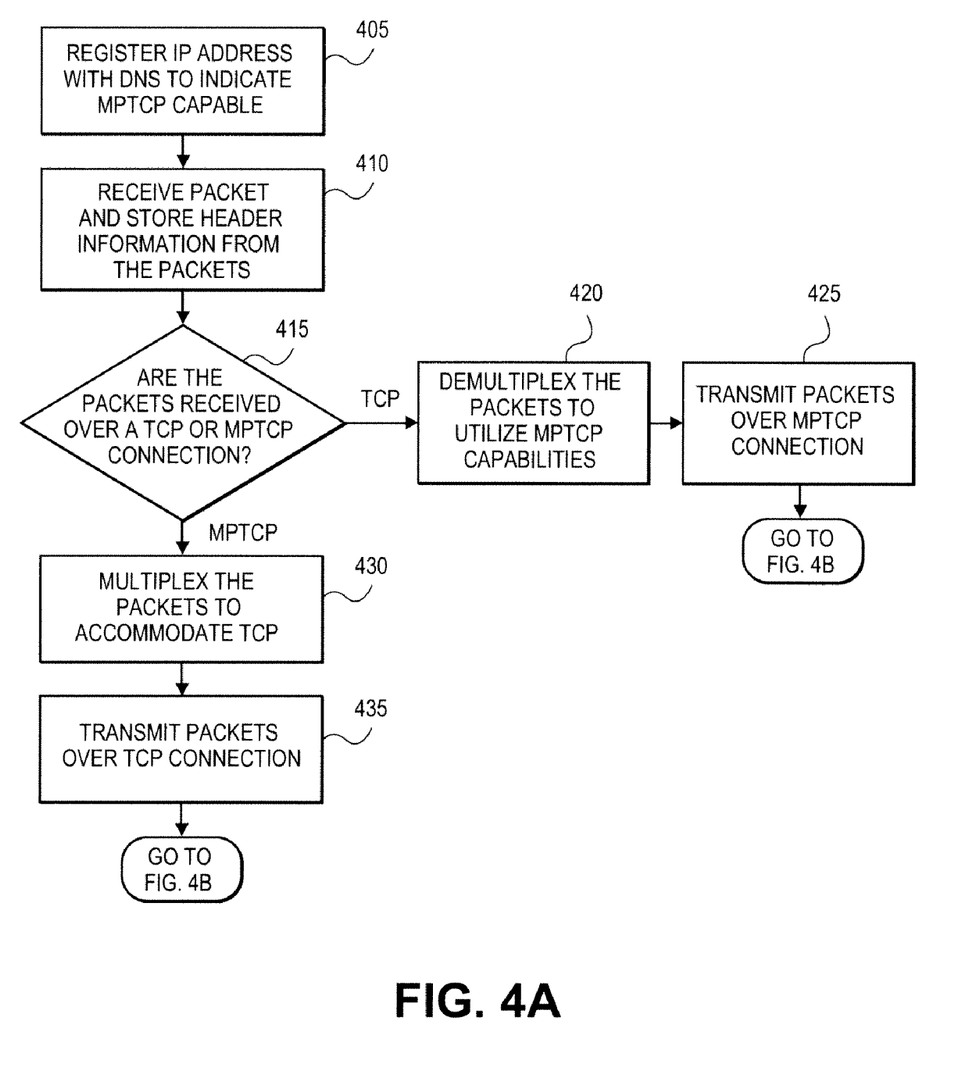
FIG. 4A depicts an exemplary method of an edge router according to one embodiment of the invention.

FIG. 4A depicts an exemplary method of an edge router according to one embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

At operation 405, edge router 110 registers an IP address of the host or client with a domain name server (DNS) to indicate an appearance that the host or client is MPTCP capable, even though the host or client is in reality only TCP capable. Then, at operation 410, edge router 110 receives packets and stores header information from the packets. The header information is used for routing an acknowledgement of receipt. The packets received by edge router 110 will be received either over a TCP connection from the TCP-capable host or client or an MPTCP connection from another device that runs MPTCP or MPTCP proxy, e.g., another edge router, server, etc. (operation 415). For packets received by edge router 110 over a TCP connection, edge router 110 demultiplexes the packets for transmission over an MPTCP connection (operation 420). The demultiplexed packets can then be transmitted over the MPTCP connection by edge router 110 (operation 425). For packets received by edge router 110 over a MPTCP connection, edge router 110 multiplexes the packets to accommodate TCP (operation 430). Edge router 110 then transmits he multiplexed packets over the TCP connection to the TCP-capable host or client (operation 435).

Figure 4B:
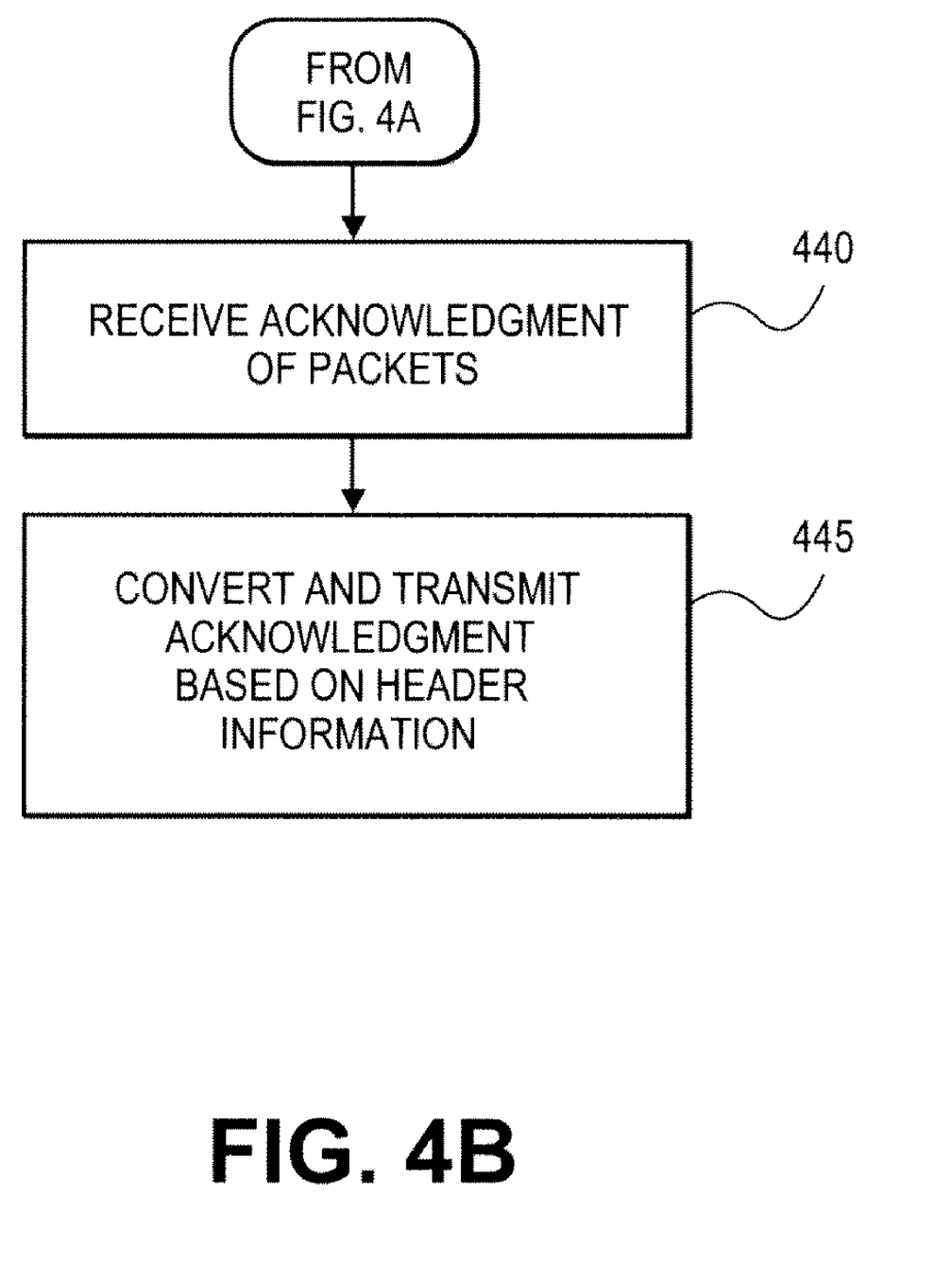
FIG. 4B depicts an exemplary acknowledgement method of an edge router according to one embodiment of the invention.

FIG. 4B depicts an exemplary acknowledgement method of an edge router according to one embodiment of the invention. The acknowledgement confirms that packets have been received. However, the acknowledgement cannot necessarily be simply passed on over a different connection because MPTCP has multiple paths that do not correspond to TCP. Therefore, conversion may be done by edge router 110.

At operation 440, edge router 110 receives acknowledgment of the packets. If the acknowledgment is received over an MPTCP connection, then it needs to be converted to accommodate a TCP connection. If the acknowledgement is received over a TCP connection, then it needs to be parsed to correspond to the appropriate paths of MPTCP. The conversion of the acknowledgement is done based on the header information previously taken in operation 410. The converted acknowledgement is then transmitted over the appropriate paths (operation 445). This conversion involves the use of the mapping of a segment on the TCP connection onto a segment on the MPTCP connection. This mapping was created when the segment was transmitted from the TCP connection to the MPTCP connection. From that time the mapping of the segment number from one connection to the other is maintained. When the acknowledgement is received the segment number mapping is used to generate an acknowledgement to the TCP connection.

Figure 5:
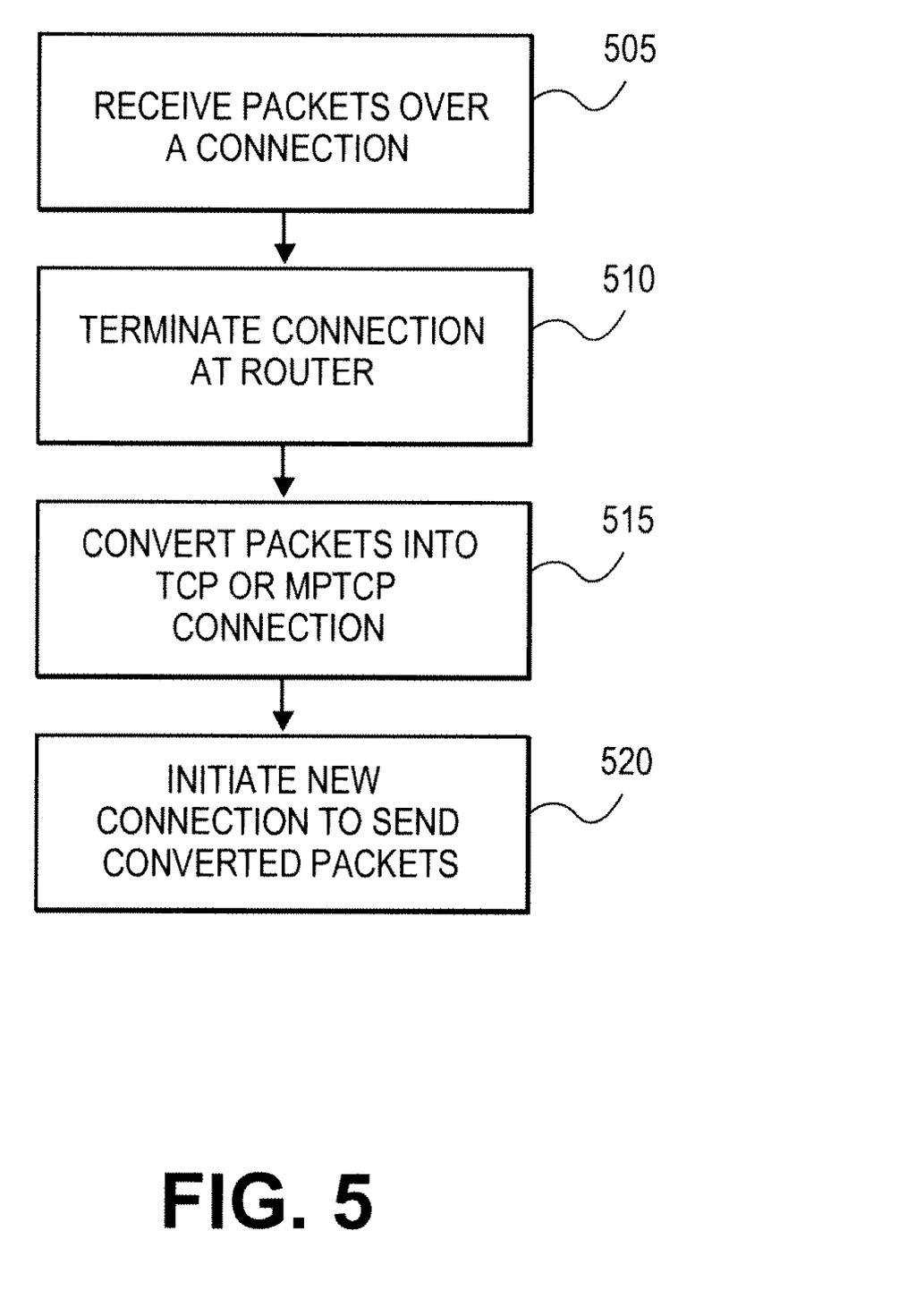
FIG. 5 depicts an exemplary method of an edge router according to one embodiment of the invention.

FIG. 5 depicts an exemplary method of an edge router according to one embodiment of the invention. This embodiment sets forth the connection initiation and termination points involving edge router 110. Rather than passing though a packet on the same connection, edge router 110 terminates a connection and initiates a new connection.

At operation 505, edge router 110 receives packets over a connection. This connection is either a TCP connection of an MPTCP connection. Upon receiving the packets, edge router 110 terminates the connection (operation 510). Edge router 110 then converts the packets for transmission over a new connection (operation 515). When the packets are received over a TCP connection, it will be transmitted over a new MPTCP connection and when the packets are received over an MPTCP connection, it will be transmitted over a new TCP connection. Edge router 110 initiates that new connection to send the converted packets (operation 520).

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first electronic device that is an edge router to facilitate communications between a subscriber end station running Transmission Control Protocol (TCP) and a second electronic device that is one of a second edge router and server end station, the method comprising the steps of:
   registering an Internet Protocol (IP) address of the subscriber end station with a domain name server to indicate that the subscriber end station is Multipath Transmission Control Protocol (MPTCP) capable, wherein the edge router runs an MPTCP proxy to facilitate the subscriber end station having only the appearance to the second electronic device of being MPTCP capable but in actuality is TCP capable and not MPTCP capable, wherein the second electronic device is running at least one of MPTCP and MPTCP proxy;
   receiving packets from the subscriber end station destined for the second electronic device or from the second electronic device destined for the subscriber end station;
   determining that the packets are received from the subscriber end station over a TCP connection or from the second electronic device over an MPTCP connection;
   in response to determining that the packets are received from the subscriber end station over the TCP connection, performing the following steps:
      demultiplexing the packets to convert the packets for transmission over the MPTCP connection, whereby utilizing MPTCP for the packets rather than maintaining TCP increases throughput by taking advantage of higher bandwidth capabilities of MPTCP compared to TCP; and
      transmitting the packets over the MPTCP connection to the second edge router or server end station; and
   in response to determining that the packets are received from the second electronic device over the MPTCP connection, performing the following steps:
      multiplexing the packets to convert the packets for transmission over the TCP connection, whereby the edge router converting from MPTCP to TCP allows the subscriber end station to receive packets from the MPTCP connection without reconfiguring its own TCP setup; and
      transmitting the packets over the TCP connection to the subscriber end station.

2. The method of claim 1, wherein upon receiving the packets from the subscriber end station over the TCP connection, further performing the following steps:
   terminating the TCP connection at the edge router; and
   initiating the MPTCP connection at the edge router to transmit the demultiplexed packets to the second electronic device.

3. The method of claim 1, wherein upon receiving the packets from the second electronic device over the MPTCP connection, further performing the following steps:
   terminating the MPTCP connection at the edge router; and
   initiating the TCP connection at the edge router to transmit the multiplexed packets to the subscriber end station.

4. The method of claim 1, in response to determining that the packets are received from the second electronic device over the MPTCP connection, further performing the following steps:
   storing header information from the packets received from the second electronic device over the MPTCP connection;
   receiving an acknowledgement from the subscriber end station over the TCP connection, wherein the acknowledgement corresponds to the packets received from the second electronic device;
   parsing the acknowledgement based on the header information for MPTCP; and
   transmitting the parsed acknowledgement to the second electronic device over the MPTCP connection.

5. The method of claim 1, in response to determining that the packets are received from the subscriber end station over the TCP connection, further performing the following steps:
   storing header information from the packets received from the subscriber end station over the TCP connection;
   receiving an acknowledgement from the second electronic device over the MPTCP connection, wherein the acknowledgement corresponds to the packets received from the subscriber end station;
   converting the acknowledgement based on the header information for TCP; and
   transmitting the converted acknowledgement to the subscriber end station over the TCP connection.

6. The method of claim 1, wherein the subscriber end station is a host running TCP and unaware of an MPTCP conversion and wherein the second electronic device is a second edge router running MPTCP proxy for a second host running TCP, whereby two hosts running TCP utilize MPTCP advantages including higher bandwidth.

7. The method of claim 1, wherein the subscriber end station is a host running TCP and unaware of the MPTCP conversion and wherein the second electronic device is a server running MPTCP.

8. An edge router configured to utilize a Multipath Transmission Control Protocol (MPTCP) connection for a subscriber end station running Transmission Control Protocol (TCP), the edge router being a first electronic device, the edge router comprising:
- a registration module configured to register an Internet Protocol (IP) address of the subscriber end station with a domain name server to indicate that the subscriber end station is MPTCP capable, wherein the edge router runs MPTCP proxy to facilitate the subscriber end station having only the appearance to a second electronic device running at least one of MPTCP and MPTCP proxy of being MPTCP capable but in actuality is TCP capable and not MPTCP capable;
- an input module configured to receive packets from the subscriber end station over a TCP connection;
- a packet conversion module configured to demultiplex the packets to utilize MPTCP, whereby utilizing MPTCP for the packets rather than maintaining TCP increases throughput by taking advantage of higher bandwidth capabilities of MPTCP compared to TCP; and
- an output module configured to transmit the packets out of the edge router over an MPTCP connection to the second electronic device, wherein the second electronic device runs one of MPTCP and MPTCP proxy and is one of a second edge router and a server end station.

9. The edge router of claim 8, wherein the input module is also configured to receive another set of packets from the second electronic device over the MPTCP connection, the packet conversion module is also configured to multiplex the another set of packets to accommodate TCP, whereby by implementing MPTCP to TCP conversion of the another set of packets, the edge router allows the subscriber end station to receive packets from the MPTCP connection without reconfiguring its own TCP setup, and the output module is also configured to transmit the another set of packets out of the edge router over the TCP connection to the subscriber end station.

10. The edge router of claim 9, wherein the packet conversion module is also configured to terminate the MPTCP connection between the second electronic device and the edge router and initiate the TCP connection between the edge router and the subscriber end station.

11. The edge router of claim 9, wherein the packet conversion module is also configured to store header information from the packets received from the second electronic device over the MPTCP connection, the input module is also configured to receive an acknowledgement from the subscriber end station over the TCP connection, wherein the acknowledgement corresponds to the packets received from the second electronic device, wherein the packet conversion module is also configured to parse the acknowledgement based on the header information for MPTCP, and the output module to transmit the parsed acknowledgement to the second electronic device over the MPTCP connection.

12. The edge router of claim 8, wherein the packet conversion module is also configured to terminate the TCP connection between the subscriber end station and the edge router and initiate the MPTCP connection between the edge router and the second electronic device.

13. The edge router of claim 8, wherein the packet conversion module is also configured to store header information from the packets received from the subscriber end station over the TCP connection, the input module is also configured to receive an acknowledgement from the second electronic device over the MPTCP connection, wherein the acknowledgement corresponds to the packets received from the subscriber end station, the packet conversion module is also configured to convert the acknowledgement based on the header information for TCP, and the output module is also configured to transmit the converted acknowledgement to the subscriber end station over the TCP connection.

14. The edge router of claim 8, wherein the subscriber end station running TCP is unaware of an MPTCP conversion and wherein the second electronic device is a second edge router configured to run MPTCP proxy for a second subscriber end station running TCP, whereby two subscriber end stations running TCP utilize MPTCP advantages including higher bandwidth.

15. The edge router of claim 8, wherein the subscriber end station running TCP is unaware of the MPTCP conversion and wherein the second electronic device is a server end station configured to run MPTCP.

* * * * *